(12) United States Patent
Banna et al.

(10) Patent No.: US 8,462,839 B2
(45) Date of Patent: *Jun. 11, 2013

(54) RECEIVER EMPLOYING NON-PILOT REFERENCE CHANNELS FOR EQUALIZING A RECEIVED SIGNAL

(75) Inventors: Rami Banna, Kensington (AU); Uwe Sontowski, Riverview (AU); Long Ung, Bexley (AU); Graeme K. Woodward, Epping (AU)

(73) Assignee: Agere Systems LLC, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,654

(22) Filed: Dec. 6, 2011

(65) Prior Publication Data

US 2012/0076194 A1     Mar. 29, 2012

Related U.S. Application Data

(63) Continuation of application No. 12/158,388, filed as application No. PCT/US2007/000622 on Jan. 10, 2007, now Pat. No. 8,098,723.

(60) Provisional application No. 60/758,514, filed on Jan. 12, 2006.

(51) Int. Cl.
*H03H 7/30* (2006.01)

(52) U.S. Cl.
USPC .......................................... 375/232; 375/350

(58) Field of Classification Search
USPC .................. 375/229–234, 346, 350
See application file for complete search history.

(56) References Cited

U.S. PATENT DOCUMENTS

| 4,021,738 A | 5/1977 | Gitlin et al. |
| 4,633,482 A | 12/1986 | Sari |

(Continued)

FOREIGN PATENT DOCUMENTS

| EP | 0 860 996 A2 | 8/1998 |
| EP | 1 372 308 A1 | 12/2003 |

(Continued)

OTHER PUBLICATIONS

Notification of Transmittal of the International Search Report and The Written Opinion of the International Searching Authority, or the Declaration; Mailed Mar. 4, 2008 for the corresponding PCT Application No. PCT/US2007/000622.

(Continued)

*Primary Examiner* — Emmanuel Bayard
(74) *Attorney, Agent, or Firm* — Mendelsohn, Drucker & Associates, P.C.; Craig M. Brown; Steve Mendelsohn

(57) ABSTRACT

In one embodiment, a receiver has a reference generator and a main equalizer. The reference generator equalizes a received signal using one or more pilot reference signals. Then, the reference generator decodes one or more predetermined data channels of the equalized signal, makes hard decisions on the data of each decoded channel, and regenerates the original coding sequence of each decoded channel. The main equalizer uses each re-encoded channel as an additional reference signal along with one or more pilot signals to equalize a time-delayed version of the received signal. In alternative embodiments, the receiver might also have a step-size generator which selects optimum step sizes from a look-up table based on the number of re-encoded channels and the power of those channels. The step size is then used by the main equalizer along with the re-encoded channels to equalize the time-delayed received signal.

14 Claims, 9 Drawing Sheets

U.S. PATENT DOCUMENTS

| | | | |
|---|---|---|---|
| 5,313,411 A | 5/1994 | Tsujimoto | |
| 5,331,663 A | 7/1994 | Kurokami | |
| 5,493,585 A * | 2/1996 | Leverington et al. | 375/232 |
| 5,574,400 A | 11/1996 | Fukuchi | |
| 5,828,589 A | 10/1998 | Degenhardt | |
| 7,072,392 B2 | 7/2006 | Xia et al. | |
| 7,269,212 B1 | 9/2007 | Chau et al. | |
| 7,469,003 B2 * | 12/2008 | Papasakellariou | 375/147 |
| 8,098,723 B2 * | 1/2012 | Banna et al. | 375/232 |
| 2002/0172275 A1 * | 11/2002 | Birru | 375/233 |
| 2002/0186761 A1 * | 12/2002 | Corbaton et al. | 375/231 |
| 2003/0174608 A1 | 9/2003 | Nakamura et al. | |
| 2003/0219113 A1 | 11/2003 | Bershad et al. | |
| 2004/0001426 A1 | 1/2004 | Mailaender et al. | |
| 2004/0127164 A1 | 7/2004 | Mondragon-Torres et al. | |
| 2005/0069064 A1 | 3/2005 | Propp et al. | |
| 2005/0128985 A1 | 6/2005 | Liberti, Jr. et al. | |
| 2005/0249274 A1 | 11/2005 | Larosa et al. | |
| 2006/0294170 A1 | 12/2006 | Matsuoka et al. | |
| 2008/0063041 A1 | 3/2008 | Galperin et al. | |
| 2008/0279270 A1 * | 11/2008 | Zeng | 375/231 |
| 2009/0207899 A1 * | 8/2009 | Chen et al. | 375/231 |
| 2012/0195358 A1 * | 8/2012 | Pan | 375/229 |

FOREIGN PATENT DOCUMENTS

| | | |
|---|---|---|
| FR | 2860669 | 4/2005 |
| WO | WO 2007126446 A2 | 11/2007 |

OTHER PUBLICATIONS

"Adaptive Chip-Rate Equalization of Downlink Multirate Wideband CDMA," by Adam R. Margetts et al, IEEE Transactions on Signal Processing, vol. 53, No. 6, Jun. 2005, XP011132701, pp. 2205-2215.

Examiner's Office Letter; Mailed Jan. 30, 2012 for corresponding Japanese Application No. 2008-550377.

* cited by examiner

```
1   if (chip_count mod HSSCCH_SELECTOR_FREQUENCY == 0)
2   {
3       for k = 1 to 4
4       {
5           Set all HSSCCH_Channel_Enabled[k] to FALSE;
6           Calculated_SQPWRS[k] = 0 ;
7           Calculated_pwr_ratio[k] = 0;
8           TCBin[k] = 0;
9       }
10      for k = 1 to 4
11          if HSSCCH_Channel_SW_Enabled[k]
12          {
13              Hsscch_Power_Est[k]= Hsscch_Power_Sum[k] / Hsscch_Power_Nr[k];
14              Calculated_pwr_ratio[k] = Hsscch_Power_Est[k]/Cpich_Power_estimate*16;
15              if (Calculated_pwr_ratio[k] > HSSCCH_MAX_PWR_FOR_TRAINING)
16                  Calculated_pwr_ratio[k] = HSSCCH_MAX_PWR_FOR_TRAINING;
17  /* note this is to make sure that the equaliser weights don't go unstable we never expect HSSCCH training on much
18  better than -7 db which is a ratio of 2 considering that the pilot is usually -10db */
19              if (Calculated_pwr_ratio[k] > HSSCCH_MIN_PWR_FOR_TRAINING)    // usually 25%; if there is
20              at least 25% of CPICH power then enable HSSCCH
21              {
22                  Calculated_SQPWRS[k] = sqrt(Calculated_pwr_ratio[k]);
23                  HSSCCH_Channel_Enabled[k]=TRUE;
24              }
25  /*This calculates four bins, Ratio > HSSCCH_BIN_LIMIT_MAX , HSSCCH_BIN_LIMIT_MAX >= Ratio >
26  HSSCCH_BIN_LIMIT_MID , HSSCCH_BIN_LIMIT_MID >= Ratio > HSSCCH_BIN_LIMIT_MIN, and Ratio <=
27  HSSCCH_BIN_LIMIT_MIN */
28              if (Calculated_pwr_ratio[k] > HSSCCH_BIN_LIMIT_MAX)
29                  TCBin[k]=3;
30              else if (Calculated_pwr_ratio[k] > HSSCCH_BIN_LIMIT_MID)
31                  TCBin[k]=2;
32              else if (Calculated_pwr_ratio[k] > HSSCCH_BIN_LIMIT_MIN)
33                  TCBin[k]=1;
34              else TCBin[k]=0;
35          }
36  }
```

```
37  sort(TCBin)
38  /* this sorts the four 2 bit integers in TCBin[0..3] so that TCBin[0]>=TCBin[1]>=TCBin[2]>=TCBin[3]*/
39  /* Now take the four 2 bit integers as a four digit number TC with every digit <=3*/
40  /* this is a 8 bit binary number from 0 to 255, for readability it is recalculated into decimal :*/
41  TCsorted= TCBin[0]*1000+TCBin[1]*100+TCBin[2]*10+TCBin[3];
42  Case TCsorted of
43  0000 : DeltaLUTindex=0;
44  1000 : DeltaLUTindex=1;
45  1100 : DeltaLUTindex=2;
46  1110 : DeltaLUTindex=3;
47  1111 : DeltaLUTindex=4;
48  20xx : DeltaLUTindex=5;/*x= any */
49  21xx : DeltaLUTindex=5;
50  22xx : DeltaLUTindex=6;
51  3xxx : DeltaLUTindex=7;
```

| PARAMETER | MEANING |
|---|---|
| HSSCCH_SELECTOR_FREQUENCY | The frequency at which to enable the channel Enable Selector. |
| HSSCCH_Channel_Enabled[k] | Parameter to indicate which control channel can be used for HSSCCH training. This value is calculated. If HSSCCH_Channel_SW_Enabled[4] is set to FALSE, then HSSCCH_Channel_Enabled[4] will also be FALSE. |
| Hsscch_Power_Est[k] | The total HSSCCH power from HSSCCH Channel Power Calculator block 332. |
| Hssch_Power_Nr[k] | The number of symbols used in the Hsscch_Power_Est[k] calculation. |
| Cpich_Power_estimate | The calculated CPICH power from CPICH Channel Power Calculator 330. |
| Calculated_SQPWRS[k] | Equal to $\sqrt{\dfrac{Hsscch\_Power\_Est[k]}{Cpich\_Power\_Estimate}} \times 16$. |
| HSSCCH_Channel_SW_Enabled[k] | These 4 bits enable training using the four HSSCCH channels. Whether an enabled channel will be used for training is decided in Channel Enable/ Step-size Selector 334. |
| Calculated_pwr_ratio[k] | Equal to $\dfrac{Hsscch\_Power\_Est[k]}{Cpich\_Power\_Estimate} \times 16$. The 16 is due to sqrt(HSSCCH_SF / CPICH_SF) where CPICH has 16 times more power than HSSCCH. |
| TCsorted | 8-bit number indicating the result of the sorting of the four 2-bit power bins. |
| DeltaLUTindex | The 3-bit number used to look up the step size in the look-up table. 0<= DeltaLUTindex <=7. |
| HSSCCH_MIN_PWR_FOR_TRAINING | Minimum power ratio for enabling channels for training. |
| HSSCCH_MAX_PWR_FOR_TRAINING | Maximum power ratio for enabling channels for training; the power ratio saturates at this value. |
| HSSCCH_BIN_LIMIT_MIN, HSSCCH_BIN_LIMIT_MID, HSSCCH_BIN_LIMIT_MAX | The minimum bin limit, The middle bin limit, The maximum bin limit. |

FIG. 5

RECEIVER EMPLOYING NON-PILOT REFERENCE CHANNELS FOR EQUALIZING A RECEIVED SIGNAL

CROSS-REFERENCE TO RELATED APPLICATIONS

This application claims the benefit of the filing date of U.S. provisional application No. 60/758,514, filed on Jan. 12, 2006, the teachings of which are incorporated herein by reference.

This application is a continuation of co-pending U.S. non-provisional application Ser. No. 12/158,388, filed on Jun. 20, 2008, the teachings of which are incorporated herein by reference in their entirety.

BACKGROUND OF THE INVENTION

1. Field of the Invention

The present invention relates to signal processing receivers, and, more specifically, to equalizing signals received by such devices.

2. Description of the Related Art

Overview of Prior-Art Receiver

FIG. 1 shows a block diagram of one implementation of a prior-art receiver 100 that uses a pilot channel to equalize (e.g., initialize ("train") and track) a received signal. Receiver 100 has upstream processing 102, chip-rate normalized-least-mean-squares (NLMS) equalizer 104, de-scrambler and de-spreader 106, and downstream processing 108. Upstream processing 102 performs pre-equalization processing which might include analog-to-digital conversion, root raised-cosine filtering, or other processing to prepare a received signal for equalization. NLMS equalizer 104 receives digital data $y(i)$ from upstream processing 102, equalizes signal $y(i)$ to closely approximate the original pre-transmission signal, and outputs equalized signal $\hat{x}(i)$ to de-scrambler and de-spreader 106. De-scrambler and de-spreader 106 removes the scrambling code and spreading sequences from equalized signal $\hat{x}(i)$ and outputs soft symbols $r(n)$. Soft symbols $r(n)$ are then processed by downstream processing 108, which might include symbol estimation, data symbol de-mapping, or other post-equalization processing for recovering one or more output data streams from the received signal.

NLMS equalizer 104 equalizes digital signal $y(i)$ using an update loop which comprises finite impulse response (FIR) filter 110, coefficient updater 112, and error calculator 114. FIR filter 110 receives incoming digital signal $y(i)$, applies coefficients $w(i)$ to signal $y(i)$, and outputs equalized signal $\hat{x}(i)$. Coefficients $w(i)$ are calculated by coefficient updater 112 using (1) incoming signal $y(i)$ and (2) an error signal $e(i)$ received from error calculator 114. Error signal $e(i)$ and coefficients $w(i)$ are continuously updated at a maximum rate of one update per chip interval.

Coefficient Calculation Using a Normalized-Least-Mean-Squares Approach

Coefficients $w(i)$ may be calculated using any one of a number of approaches commonly known in the art. According to the embodiment of FIG. 1, coefficient updater 112 receives signal $y(i)$ and error signal $e(i)$ and calculates new coefficients $w(i+1)$ using a normalized-least-mean-squares (NLMS) approach. The NLMS approach is a variation of the least-mean-squares (LMS) approach, wherein each new coefficient $w(i+1)$ is calculated as shown in Equation (1) below:

$$w_{LMS}(i+1) = w_{LMS}(i) - \mu \nabla_w E[|e(i)|^2], \quad (1)$$

where $\nabla_w$ is the gradient of the expected value $E[|e(i)|^2]$ of error signal $e(i)$, and $\mu$ is the update step size.

The expected value $E[|e(i)|^2]$ (a.k.a., mean squared error (MSE)) can be represented as an "error performance surface." A gradient descent approach is used to step across the surface to arrive at the minimum-mean-squared error (MMSE), which is represented by a local minimum on the surface. As the MSE of Equation (1) approaches the MMSE, the accuracy of tap weights $w(i)$ increases. Substituting an instantaneous estimate for the expectation of Equation (1) yields the particular LMS calculation of Equation (2) as follows:

$$w_{LMS}(i+1) = w_{LMS}(i) - \Delta y(i) e^*(i), \quad (2)$$

where a small scalar is chosen as the step size $\Delta$ and $e^*(i)$ is the complex conjugate of error signal $e(i)$. To obtain the NLMS coefficient $w_{NLMS}(i+1)$, LMS Equation (2) is normalized to produce Equation (3) as follows:

$$w_{NLMS}(i+1) = w_{NLMS}(i) - \tilde{\Delta} \frac{y(i) e^*(i)}{\|y(i)\|^2}. \quad (3)$$

As shown, new NLMS coefficient $w_{NLMS}(i+1)$ uses a step size $\tilde{\Delta}$, which reduces the complexity of tuning the step size.

Error Calculation

The accuracy of NLMS equalizer 104 in approximating the original pre-transmission signal is measured by error signal $e(i)$. Thus, a smaller error $e(i)$ represents improved equalizer performance. Error signal $e(i)$ is obtained by comparing equalized output $\hat{x}(i)$ of FIR filter 110 to a reference signal $x(i)$ as shown in Equation (4) below:

$$e(i) = \hat{x}(i) - x(i) \quad (4)$$

Reference signal $x(i)$ represents an expected value for the received signal, neglecting the effects of transmission. Thus, error signal $e(i)$ decreases as equalized output $\hat{x}(i)$ more closely approximates expected reference $x(i)$ known by receiver 100.

In typical transmissions, a large portion of the transmitted signal is not known by the receiver. However, a pilot signal $z(i)$, which contains a known sequence of bits, may be transmitted for training and tracking purposes. Substituting pilot $z(i)$ for reference $x(i)$ in Equation (4) yields error signal $e'(i)$ as shown in Equation (5):

$$e'(i) = z(i) - \hat{x}(i) \quad (5)$$

The complex conjugate of error signal $e'(i)$ may then be substituted for error $e^*(i)$ in Equation (3) to produce new NLMS coefficient $w_{NLMS}(i+1)$.

In a $3^{rd}$ Generation Partnership Project (3GPP) application, receivers are equalized using the common pilot channel (CPICH). Furthermore, CPICH has a scrambled sequence $c_{scram}(i)$ and a spread sequence $c_{ch}(i)$ which are known by the receiver. For 3GPP Release 5 compatible receivers, either the primary pilot channel (PCPICH), the secondary pilot channel (SCPICH), or both may be used for continuous tracking and training. SCPICH has a spreading sequence and a scrambling code which are unique from PCPICH.

Pilot signal power in 3GGP and other applications is typically limited to 10 percent of the total transmission power. Since the pilot signal represents only a small portion of the total received signal power, signal error $e'(i)$ never closely approximates zero. Additionally, since only pilot $z(i)$ is used in calculating the gradient estimate, the unknown data symbols of input signal $y(i)$ contribute to the gradient noise. In order to minimize error $e'(i)$, and thus increase the performance of equalization, the pilot signal power can be increased. Increasing pilot signal power, however, reduces the amount of data that can be transmitted along with the pilot signal.

SUMMARY OF THE INVENTION

In one embodiment, the present invention is a method for equalizing received signals. The method comprises: (a) equalizing a first set of one or more received signals to generate a first set of one or more equalized signals, (b) processing the first set of one or more equalized signals to generate a first set of one or more decoded data streams corresponding to a first set of one or more non-pilot channels in the received signals, (c) generating one or more reference signals from the first set of one or more decoded data streams, and (d) equalizing a second set of one or more received signals to generate a second set of one or more equalized signals. The equalization of the first set of one or more equalized signals is based on at least one pilot channel in the received signals. Furthermore, the equalization of the second set of one or more received signals is based on (1) the at least one pilot channel and (2) the one or more reference signals generated from the first set of one or more decoded data streams.

In another embodiment, the present invention is an apparatus for equalizing received signals. The apparatus comprises: (a) a first equalizer adapted to equalize a first set of one or more received signals to generate a first set of one or more equalized signals, (b) a first decoder adapted to process the first set of one or more equalized signals to generate a first set of one or more decoded data streams corresponding to a first set of one or more non-pilot channels in the received signals, (c) a reference signal generator adapted to generate one or more reference signals from the first set of one or more decoded data streams, and (d) a second equalizer adapted to equalize a second set of one or more received signals to generate a second set of one or more equalized signals. The equalization of the first set of one or more equalized signals is based on at least one pilot channel in the received signals. Furthermore, the equalization of the second set of one or more received signals is based on (1) the at least one pilot channel and (2) the one or more reference signals generated from the first set of one or more decoded data streams.

In yet another embodiment, the present invention is a method for equalizing a received signal in a receiver. The method comprises filtering the received signal based on a set of filter coefficients to generate an equalized signal. The set of filter coefficients is adaptively generated by: (1) calculating an error signal, and (2) updating the set of filter coefficients based on the error signal. The error signal is calculated by comparing the equalized signal to one or more reference channels comprising at least a first channel having a bit pattern known a priori by the receiver wherein the first channel is used by the receiver for a purpose other than as a pilot channel.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4 shows pseudocode used by the receiver of FIG. 3 to select step sizes according to one embodiment of the present invention;

FIG. 5 shows a table which lists the parameters used by the pseudocode of FIG. 4.

DETAILED DESCRIPTION

Generating Additional Reference Signals from Data Signals

Figure 1:
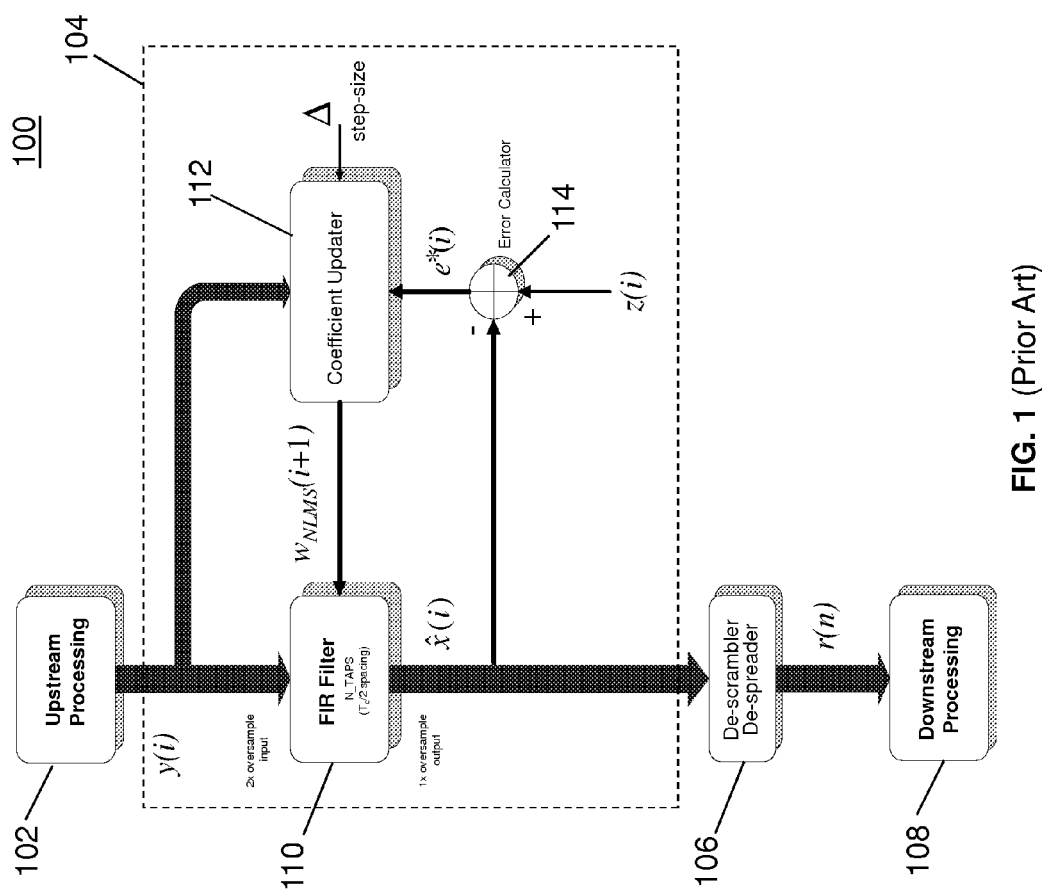
FIG. 1 shows a simplified block diagram of one implementation of a prior-art receiver that uses a pilot channel to equalize received signals.
Figure 2:
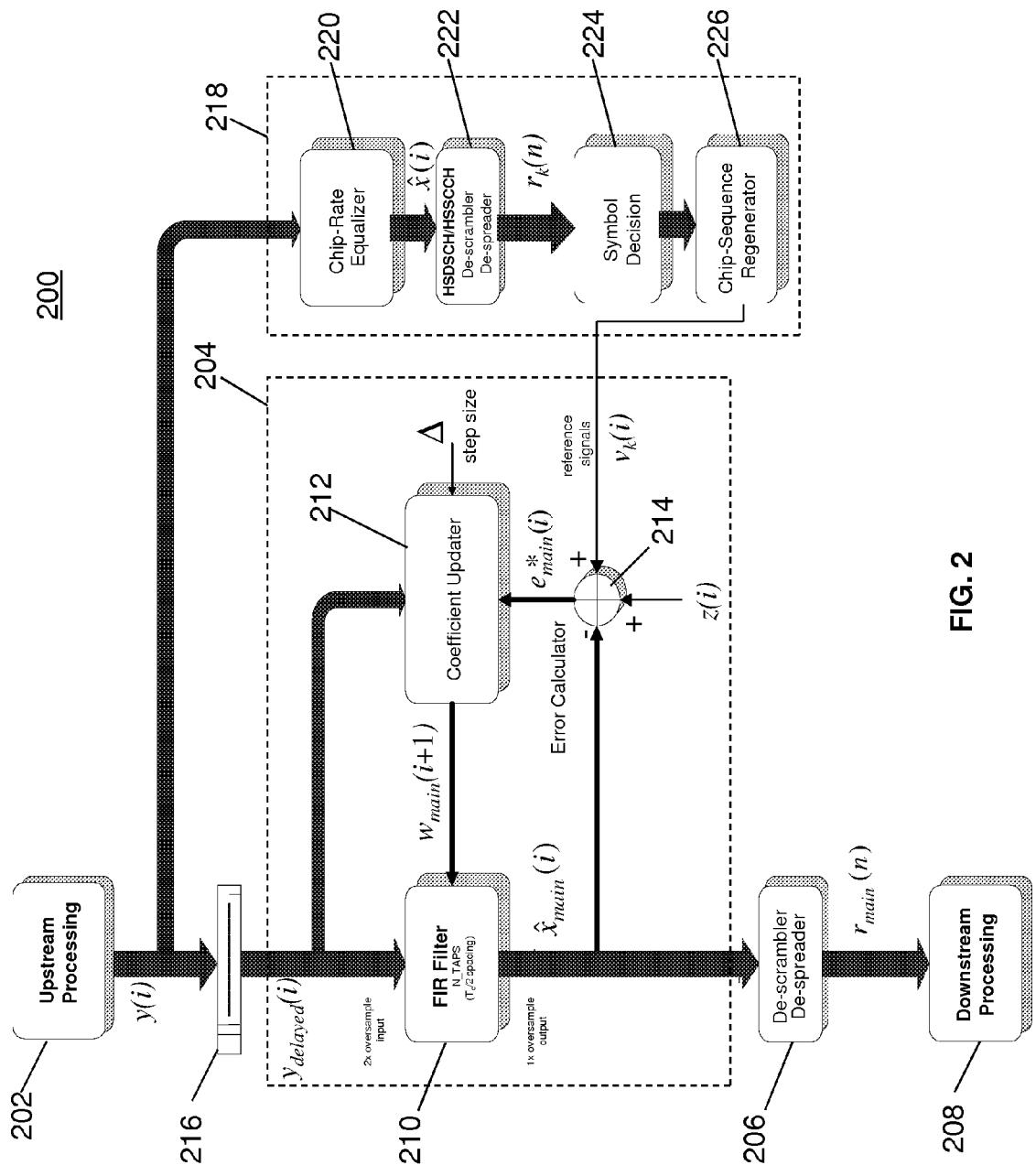
FIG. 2 shows a simplified block diagram of a receiver according to one embodiment of the present invention that generates additional reference signals from received data signals and uses the reference signals to equalize the received signals.

FIG. 2 shows a simplified block diagram of a receiver 200 according to one embodiment of the present invention. Receiver 200 is adapted to generate additional reference signals from received signals and use the additional reference signals to equalize the received signals. Receiver 200 has upstream processing 202, de-scrambler and de-spreader 206, and downstream processing 208, which are analogous to upstream processing 102, de-scrambler and de-spreader 106, and downstream processing 108 of prior-art receiver 100 of FIG. 1. Receiver 200 also has reference generator 218, main chip-rate normalized-least-mean-squares (NLMS) equalizer 204, and input sample delay buffer 216.

Reference generator 218 has auxiliary NLMS chip-rate equalizer 220, de-spreader and de-scrambler 222, symbol decision block 224, and chip-sequence regenerator 226. Auxiliary NLMS equalizer 220 receives digital signal $y(i)$ from upstream processing 202, equalizes signal $y(i)$ in a manner similar to NLMS equalizer 104 of prior-art receiver 100 (i.e., using pilot channel $z(i)$ as a reference), and outputs equalized signal $\hat{x}(i)$. De-scrambler and de-spreader 222 receives equalized signal $\hat{x}(i)$, removes the scrambling code and spreading sequence from each channel k which is to be used as a reference, and outputs soft symbols $r_k(n)$ for each reference channel k. Symbol decision block 224 then makes hard decisions on the soft symbols $r_k(n)$. The hard decisions are scrambled and spread by chip sequence regenerator 226 using the original spreading sequence and scrambling code to form an additional reference $v_k(i)$ for each channel k. The one or more references $v_k(i)$ are then treated as known signals by main NLMS equalizer 204 to equalize the received signals.

Equalizing a Received Signal Using Additional Reference Signals

Input sample delay buffer 216 delays received digital signal $y(i)$ and transmits delayed signal $y_{delayed}(i)$ to main NLMS equalizer 204. Similar to prior-art NLMS equalizer 104, main NLMS equalizer 204 is an update loop comprising finite impulse response (FIR) filter 210, coefficient updater 212, and error calculator 214. FIR filter 210 receives delayed signal $y_{delayed}(i)$, applies coefficients $w_{main}(i)$ to signal $y_{delayed}(i)$, and outputs equalized signal $\hat{x}_{main}(i)$. Coefficients $w_{main}(i)$ are calculated by coefficient updater 212 using (1) error signal $e_{main}(i)$ received from error calculator 214 and (2) delayed signal $y_{delayed}(i)$. Error signal $e_{main}(i)$ and tap weights $w_{main}(i)$ are continuously updated at a maximum rate of one update per chip interval.

Error signal $e_{main}(i)$ is calculated using pilot z(i) and one or more additional reference signals $v_k(i)$ generated from reference signal generator 218. Equation (4) is modified to produce main error signal $e_{main}(i)$ as shown below:

$$e_{main}(i) = z(i) + v_k(i) - \hat{x}_{main}(i) \quad (6)$$

Note that, depending on the channels used as additional references, the additional reference signals $v_k(i)$ might be weighted.

New tap weights $w_{main}(i+1)$ are then calculated using main error signal $e_{main}(i)$ and delayed incoming signal $y_{delayed}(i)$ by modifying Equation (3) as shown in Equation (7):

$$w_{main}(i+1) = w_{main}(i) - \tilde{\Delta} \frac{y_{delayed}(i) e^*_{main}(i)}{\|y_{delayed}(i)\|^2} \quad (7)$$

After equalization, the spreading sequences and scrambling codes are removed by de-scrambler and de-spreader 206 from equalized signal $\hat{x}_{main}(i)$ to obtain soft symbols $r_{main}(n)$, which are further processed by downstream processing 208.

By adding one or more additional reference signals $v_k(i)$ to the error calculation, error signal $e_{main}(i)$ may more closely approximate zero than error signal e'(i) of prior-art receiver 100. This more-accurate error calculation improves the training and tracking performance of receiver 200 over prior-art receiver 100 when using the same step size $\tilde{\Delta}$. Furthermore, since training and tracking is more accurate, throughput of the equalizer can also be increased.

By maintaining the pilot power and using additional reference signals as described above, the effective power available for training and tracking can be increased without reducing the amount of transmitted data. This increase in power improves the performance of the receiver by decreasing the bit error rate, and therefore, increases the overall throughput of the receiver. On the other hand, the pilot power can be decreased while using additional reference signals for training and tracking, where the decrease in pilot power permits more data to be transmitted while the receiver maintains a bit error rate that is the same as the prior-art receiver. Other implementations can achieve both decreased bit error rate and increased data transmission rate by only partially reducing the pilot power.

Exemplary Channels that May be Used as Additional Reference Signals

This invention may be used in various applications in which a receiver equalizes a data signal using one or more pilot channels. An example of one such application is a high-speed downlink packet access (HSDPA) transmission to a 3GPP receiver. In an HSDPA transmission, the channels which may be used to generate additional reference signals include the one to four high-speed shared control channels (HSSCCHs), the primary common physical channel (PC-CPCH), the high-speed shared data channel (HSPDSCH), and the downlink physical channel (DPCH).

At least one of the HSSCCH channels will be present during an HSDPA transmission. As described above, de-scrambler and de-spreader 222 receives equalized signal $\hat{x}(i)$, removes the scrambling code and spreading sequence from each HSSCCH channel k (e.g., where k=1 to 4), and outputs soft symbols $r_k(n)$ for each channel k. Note that each of the HSSCCH channels is coded with a relatively high spreading factor (e.g., approximately 128 chips/symbol). Consequently, symbol decision block 224 can make an accurate hard decision on each soft symbol $r_k(n)$ independently. This process occurs over a period of one symbol, and thus, main equalizer 204 can operate using a delay of as little as 128 chips. Chip sequence regenerator 226 then scrambles and spreads the hard decisions for each channel k using the original spreading sequence and scrambling code of each channel k to form each additional reference signal $v_k(i)$.

The PCCPCH channel is transmitted during the remaining 90 percent of the slot when the SCH channel is not transmitted. An additional reference signal may be generated from PCCPCH in a manner similar to the method used above for the HSSCCH channels. PCCPCH has a relatively large spreading sequence (i.e., 256 chips/symbol). Consequently, accurate hard decisions may be made on each PCCPCH soft symbol independently, and main equalizer 204 can operate using a delay of as little as 256 chips.

HSPDSCH has a relatively small spreading sequence (i.e., approximately 16 chips/symbol). Due to the small spreading sequence, symbol decision block 224 might not be able to make an accurate hard decision on each soft symbol $r_k(n)$ independently. Instead, symbol decision block 224 receives a number of symbols and performs a cyclic redundancy check. If there is no error among the symbols, then symbol decision block 224 makes a hard decision on each symbol. Note that this process takes more than one transmission time interval (TTI), and thus, main equalizer 204 operates using a delay of over one TTI. The symbols are then scrambled and spread by chip sequence regenerator 226 using the original channel spreading factor and scrambling code to form the additional reference $v_k(i)$.

DPCH has a spreading sequence which may change at various times. Performance of the channel will be best at times when the channel has a relatively high spreading sequence. In this case, an additional reference may be generated in a manner similar to the method used for the HSSCCH channels.

Channel Enable and Step Size Optimization

In addition to the improvements gained by using additional reference signals, further improvements in the throughput of the receiver can be achieved by selecting an optimum step size for use by the coefficient updater of the main equalizer.

Figure 3:
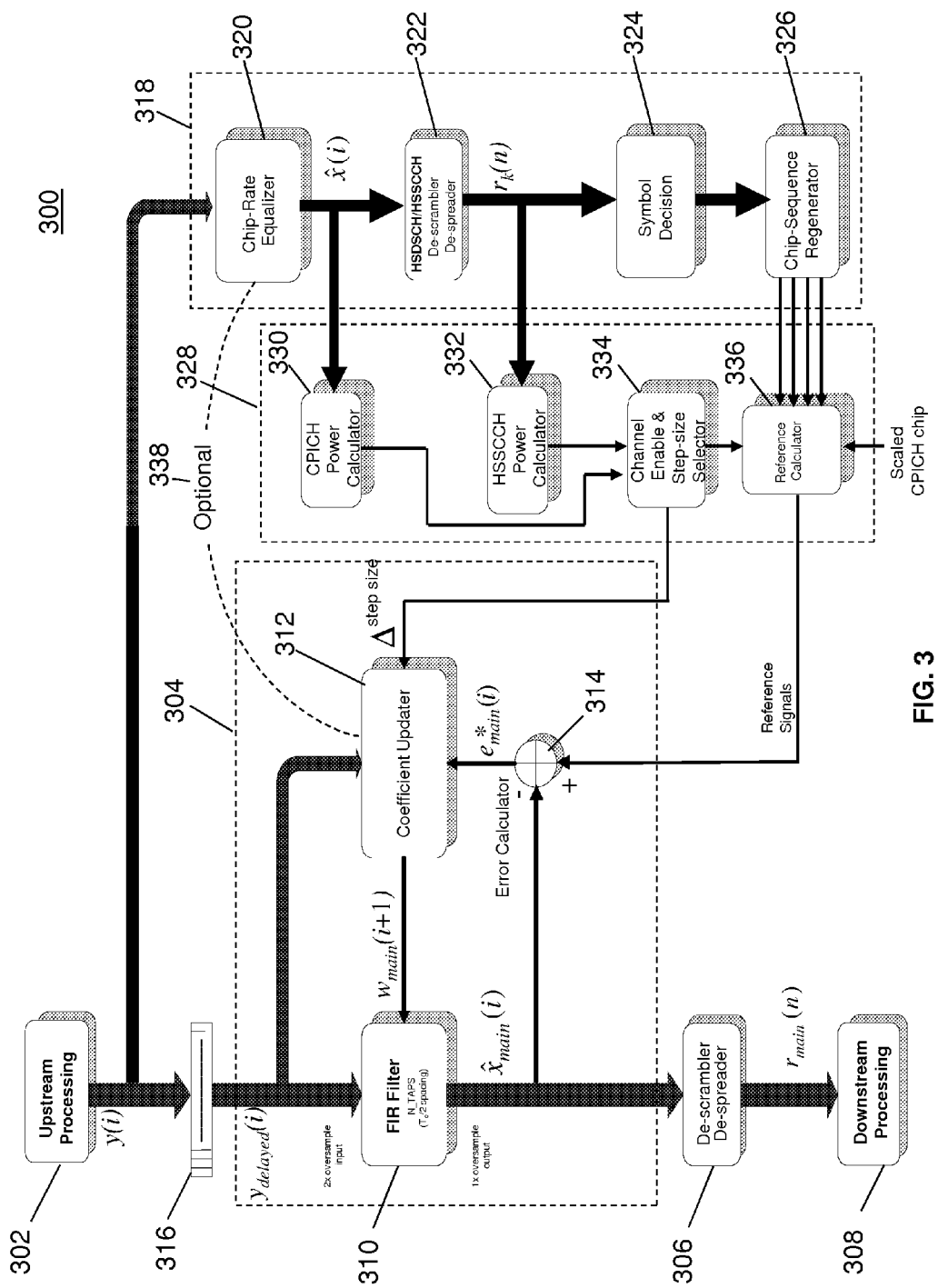
FIG. 3 shows a simplified block diagram of a receiver according to one embodiment of the present invention that generates additional reference signals from received data signals, selects a step size from a look-up table based on the additional reference signals, and uses both the reference signals and the step size to equalize the received signals.

FIG. 3 shows a simplified block diagram of a receiver 300 according to one embodiment of the present invention that generates one or more additional reference signals and selects an optimum step size $\tilde{\Delta}$ from a look-up table based on the number of additional references available and the power of those references. Receiver 300 has upstream processing 302, input sample delay buffer 316, main chip-rate normalized-least-mean-squares (NLMS) equalizer 304, de-scrambler and de-spreader 306, downstream processing 308, and reference generator 318, which perform operations analogous to those of the corresponding elements of receiver 200 of FIG. 2. In addition, receiver 300 has step-size generator 328. For ease of discussion, the following assumes that receiver 300 has been designed for training and tracking using all four HSSCCH channels.

Step-size generator 328 has CPICH power calculator 330, HSSCCH channel power calculator 332, channel enable and step-size selector 334, and reference calculator 336. CPICH power calculator 330 receives equalized signal $\hat{x}(i)$ and calculates the total CPICH symbol power of the equalized signal over a given chip period using Equations (8) and (9) as follows:

$$Cpich\_Symbol_{512}(n) = \sum_{i=1}^{512} z(i)^* \hat{x}(i) \qquad (8)$$

$$Cpich\_Power(n) = (Re[CPICH\_Symbol_{512}(n)])^2 + (Im[CPICH\_Symbol_{512}(n)])^2 \qquad (9)$$

In Equations (8) and (9), a chip period of 512 chips is shown based on the reception of a transmit-diverse signal in which a complete pilot sequence comprises two CPICH symbols of 256 chips. This period may vary depending on the implementation. For example, a non-transmit diverse reception may have a period other than 512 chips such as a period of 256 chips. CPICH_Power(n) may then be low-pass filtered.

HSSCCH power calculator 332 receives de-scrambled and de-spread symbols $r_k(n)$ for each channel k and calculates the symbol power of each HSSCCH channel k for a maximum of one TTI. In this embodiment, where there are 128 chips per symbol, the power is calculated as shown in Equations (10) and (11):

$$r_k(n) = \sum_{i=1}^{128} (r_k(i)) \qquad (10)$$

$$Hsscch\_Power\_Sum_k(n) = \sum_{n=1}^{N} [(Re[r_k(n)])^2 + (Im[r_k(n)])^2], \qquad (11)$$

Where N is the number of symbols used to generate the power of Equation (11) as shown in Equation (12):

$$Hsscch\_Power\_Nr_k(n) = N \qquad (12)$$

In one possible embodiment, only one symbol is used in the power calculation, such that N is equal to one. In other embodiments, the number N of symbols used to generate the power of Equation (11) may be greater than one. For example, the power of Equation (11) may be calculated for a transmission-time interval (TTI), which is 7680 chips in length and has 128 chips per symbol. In this case, the number N would be incremented by 1 after every 128 chips until N is equal to 60 (i.e., 7680/128=60). At the beginning of the next TTI, N would be reset to 0.

Channel enable and step-size selector 334 receives the calculations from CPICH power calculator 330 and HSSCCH power calculator 332 for each HSSCCH channel k. These calculations are then used to detect which channels are available for training and tracking. Based on the number of channels available and the power of each channel, channel enable and step-size selector 334 identifies an index number that is used to retrieve an optimum step size from a look-up table. This process may be performed through sequential steps of pseudocode.

FIGS. 4 (a) and (b) show one implementation of pseudocode 400 that implements functions of channel enable and step-size selector 334 of FIG. 3. FIG. 5 shows a table of parameters for pseudocode 400 of FIGS. 4 (a) and (b). In line 1 of pseudocode 400, the chip_count is compared to a predetermined frequency HSSCCH_SELECTOR_FREQUENCY. In one possible implementation, HSSCCH_SELECTOR_FREQUENCY is selected to be 128 chips. At every 128 chips, pseudocode 400 resets the values calculated for the four HSSCCH channels during the previous iteration as shown in lines 3 through 9 of FIG. 4 (a).

At line 11, pseudocode 400 uses information received from higher layers to determine which of the HSSCCH channels are present. For each channel that may be present, channel enable and step-size selector 334 receives an HSSCCH_Channel_SW Enabled[k] signal. Pseudocode 400 then determines which of the four HSSCCH channels has sufficient power for use as additional reference signals (lines 10 through 24). Those channels which have sufficient power are then enabled. In particular, in line 13 of pseudocode 400, the average power for each HSSCCH channel (Hsscch_Power_Est[k]) is calculated by dividing the corresponding calculated HSSCCH power (Hsscch_Power_Sum[k]) by the total number of symbols (Hsscch_Power_Nr$_k$(n)) used for the power calculation. Each average power is then used to calculate a power ratio (Calculated_pwr_ratio[k]) for each channel k as shown in line 14.

The power ratio for each channel k is compared to predetermined thresholds for the maximum power ratio (HSSCCH_MAX_PWR_FOR_TRAINING) and the minimum power ratio (HSSCCH_MIN_PWR_FOR_TRAINING) (lines 15 through 20). If the power ratio for a channel k is greater than the maximum threshold, then pseudocode 400 sets the power ratio for that channel equal to the maximum threshold. Then, for each channel k whose power ratio is greater than the minimum threshold but less than or equal to the maximum threshold, pseudocode 400 calculates the square root of the power ratio (Calculated_SQPWRS[k]) and sets the enable signal (HSSCCH_Channel_Enabled[k]) to true (lines 22 and 23, respectively). Any channel k whose power ratio is below the minimum power ratio threshold is not enabled (i.e., will not be used to generate an additional reference signal).

Note that in alternative embodiments of the present invention, pseudocode 400 may generate a power value other than the power ratio described above. Furthermore, pseudocode 400 may determine if this other power value satisfies a power-threshold condition other than the minimum threshold described above. For example, pseudocode 400 might calculate a power value in which the CPICH power is divided by the HSSCCH power (i.e., Cpich_Power_estimate/Hsscch_Power_Est[k]). In this example, an HSSCCH channel satisfies the power-threshold condition when the HSSCCH channel's power value is less than a maximum threshold. Other implementations are possible within the scope of this invention.

Next, pseudocode 400 designates each channel k as a high-power, medium-power, low-power, or very low-power channel, by associating each channel to a two-bit bin number (TCBin[k]=0, 1, 2, 3) (lines 25 through 34). A high-power channel has a power ratio greater than a predetermined maximum-power ratio (HSSCCH_BIN_LIMIT MAX) and is assigned a two-bit bin number equal to 3 (lines 28 through 29). A medium-power channel has a power ratio that is greater than a predetermined middle-power ratio (HSSCCH_BIN_LIMIT_MID) and less than or equal to the maximum-power ratio. Each medium-power channel is assigned a two-bit bin number equal to 2 (lines 30 through 31). A low-power channel has a power ratio that is greater than a predetermined minimum-power ratio (HSSCCH_BIN_LIMIT_MIN) and less than or equal to the middle-power ratio. Each low-power channel is assigned a two-bit bin number equal to 1 (lines 32 through 33). A very low-power channel has a power ratio less than or equal to the minimum-power ratio and is assigned a two-bit bin number equal to 0 (line 34).

After each channel k has been assigned a bin number, pseudocode 400 sorts the channels from highest power to lowest power by arranging the two-bit bin numbers from largest to smallest, resulting in an eight-bit binary number (line 37 of FIG. 4(*b*)). This eight-bit binary number is then recalculated into a four-digit decimal number which corresponds to a three-bit look-up table index number (Delta-LUTindex=0, . . . , 7) (lines 41 through 51). As an example, a transmission that has three low-power channels and one very low-power channel produces a decimal number of 1110, which corresponds to index number 3 of the look-up table (line 46). As another example, a transmission that has one high-power channel, two medium-power channels, and a low-power channel would yield a decimal number of 3221, which corresponds to look-up table index number 7 (line 51). Note that, in this example and in certain other instances, the last two or three decimal places might not be relevant in determining the look-up table index number.

Once an index number is determined, the step size may be chosen from the look-up table. The step sizes contained in the table may be predefined by the hardware designer and may vary between applications. The selected step size is then transmitted to coefficient updater 312 of FIG. 3, where it is used to perform the coefficient calculation. Furthermore, the channel enable signal and the square root of the power ratio for each channel k are transmitted to reference calculator 336.

Figure 6:
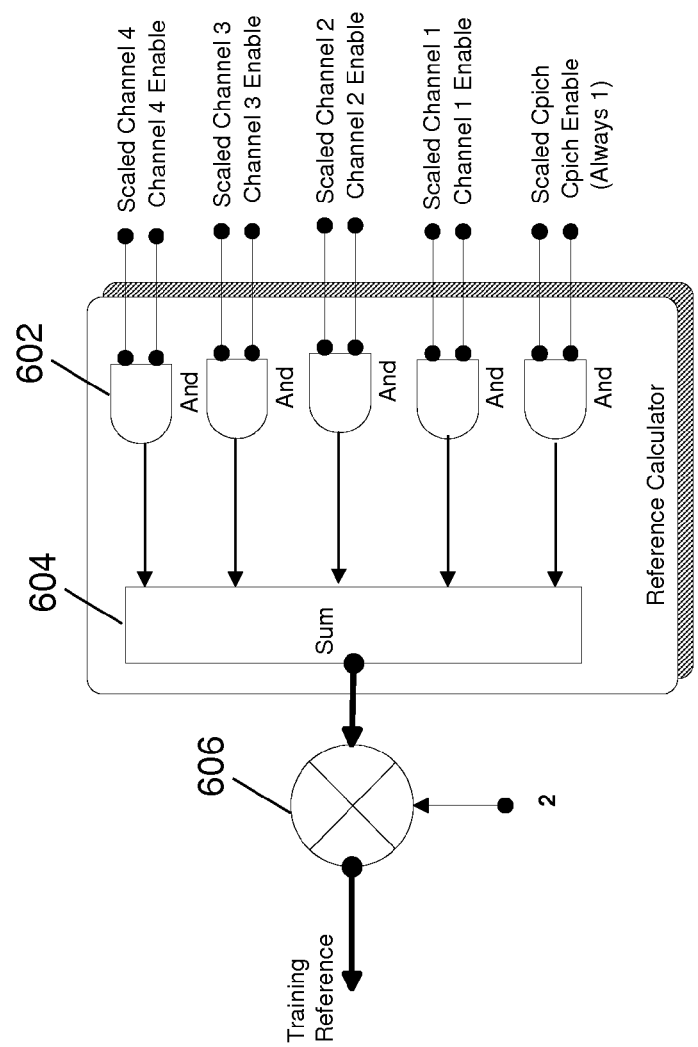
FIG. 6 shows a simplified block diagram of one embodiment of the reference calculator of the receiver of FIG. 3.

FIG. 6 shows one embodiment of reference calculator 336 of receiver 300 of FIG. 3. Reference calculator 336 has "And" gates 602 and sum block 604. Each "And" gate 602 receives either an HSSCCH channel from chip sequence regenerator 326 or the CPICH channel which is known by the receiver. Additionally, each "And" gate receives a channel enable signal which corresponds to the received channel (e.g., HSSC-CH_Channel_Enabled[k] of FIG. 4 for HSSCCH channel k). Note that the CPICH channel is always enabled. Before the enabled HSSCCH and CPICH channels are combined, they can be scaled as shown in Equations (13) and (14) below:

$$ScaledChips_k = \frac{HSSCCH\_Chips_k \times \sqrt{\frac{Hsscch\_Power\_Est[k]}{Cpich\_Power\_Estimate} \times 16}}{2} \quad (13)$$

$$ScaledChips_{Cpich} = \frac{CPICH\_Chips}{2} \quad (14)$$

The scaled HSSCCH and CPICH chips are normalized as shown above by dividing the scaled chips by a factor of 2. The factor of 2 is derived by multiplying the square root of the scrambling code power by the square root of the spreading code power (i.e., sqrt(2)×sqrt(2)). Note that in implementations that use other spreading codes and scrambling codes, the scaled factor may be a number other than 2. Each "And" gate that receives an enabled channel then transmits the corresponding scaled chips to sum block 604.

Sum block 604 adds the scaled enabled channels together to form one combined reference signal. The combined reference signal is transmitted to multiplier 606 where the reference signal is multiplied by a factor of 2. Then multiplier 606 transmits the combined reference signal to error calculator 314 of FIG. 3.

CONCLUSION

Various embodiments of the present invention may be envisioned in which channels other than those described above are used to generate additional reference signals. Such channels may be other channels used in a 3GPP transmission or channels used in applications other than 3GPP.

Furthermore, channels other than those described above may be used as additional references without being processed by reference generator 218. Such channels include those channels which have a bit pattern known a priori by the receiver and which are used for a purpose other than as a pilot channel. For example, in 3GPP receivers, the synchronization (SCH) channel, which is transmitted during the first 10 percent of each slot, has a bit pattern known by the receiver. This channel may be used in addition to the pilot channel so that the known reference x(i) in Equation (4) comprises pilot z(i) and the known value of the SCH channel. These additional reference channels may be used independent of the presence and use of a reference generator such as reference generator 218.

Alternative embodiments of the present invention may be envisioned in which equalizers other than chip-rate NLMS equalizers are used in place of the main equalizer, the auxiliary equalizer, or both the main and the auxiliary equalizers. Such other equalizers include but are not limited to LMS equalizers and recursive least-squares equalizers.

Further embodiments of the present invention may be implemented in apparatuses which have two or more receivers. The two or more receivers may be adapted so that one or more receivers act as auxiliary receivers by generating additional reference signals from data signals and the other one or more receivers act as main receivers by using the additional reference signals for equalizing received signals. For example, apparatuses having a receiver that meets R99 requirements, such as a rake receiver, and an advanced receiver for receiving Release 6 or Release 7 signals could be used for this invention.

Figure 7:
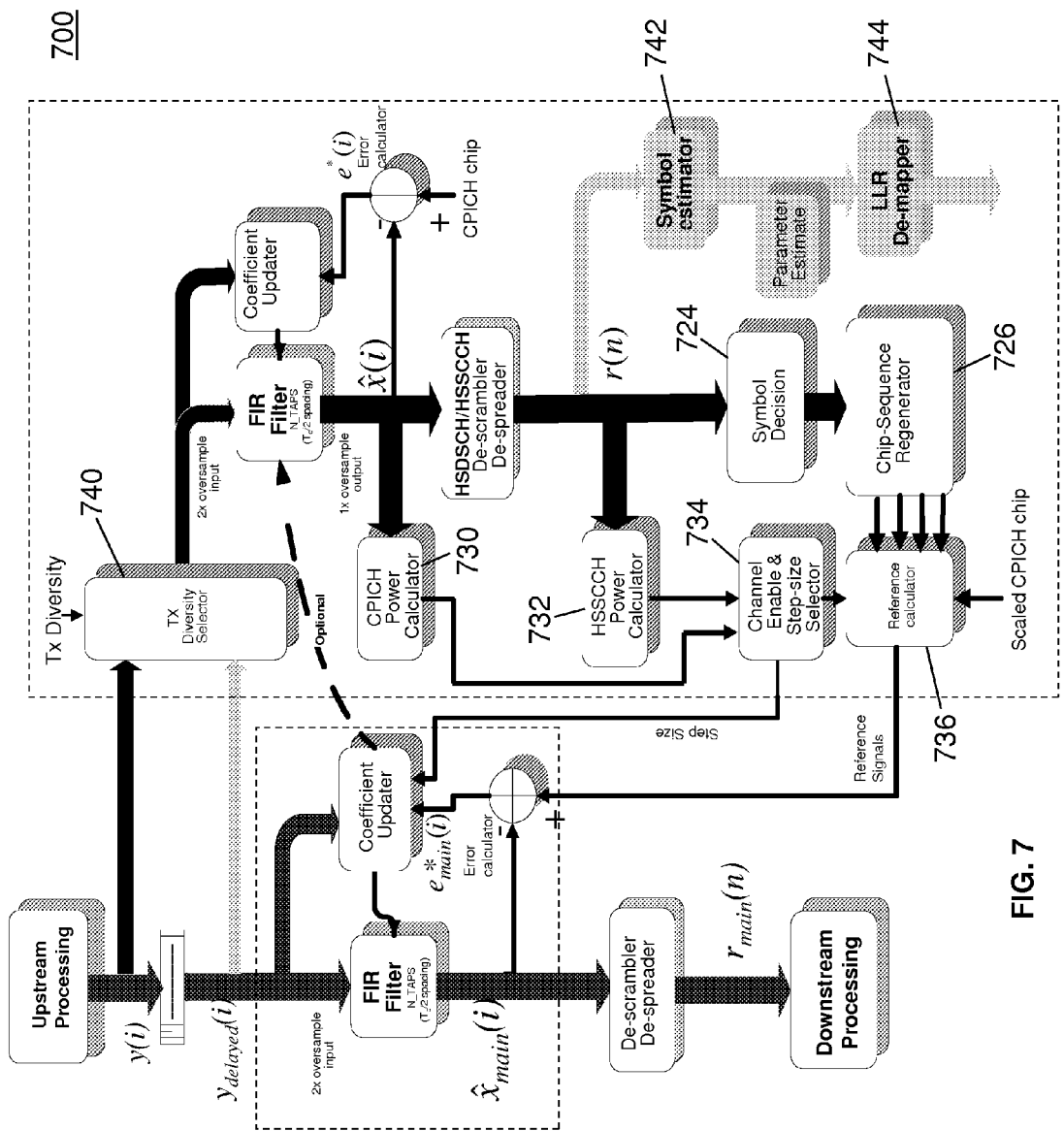
FIG. 7 shows a simplified block diagram of an apparatus according to one embodiment of the present invention that has two receivers which can be used to receive transmit-diverse signals or to generate additional reference signals.

FIG. 7 shows a simplified block diagram of an apparatus 700 according to one embodiment of the present invention that has two receivers which can be used to receive transmit-diverse signals or to generate additional reference signals. Apparatus 700 has a diversity selector 740 which switches the apparatus between a diversity reception mode and a reference signal generating mode. During reference signal generating mode, the diversity selector disables the downstream processing of the auxiliary receiver (i.e., symbol estimator 742 and LLR de-mapper 744), and apparatus 700 performs functions analogous to those of receiver 300 (i.e., generating reference signals and step sizes, and using the reference signals and step sizes to equalize the received signal). During diversity mode, the diversity selector disables CPICH power calculator 730, HSSCCH power calculator 732, channel enable and step-size selector 734, reference calculator 736, symbol decision block 724, and chip-sequence regenerator 726. In this mode, apparatus 700 receives two transmit-diverse signals and processes the two signals independently using the two receivers.

According to yet further embodiments of the present invention, the auxiliary equalizer could use coefficients w(i) calculated by the main coefficient updater. One such embodiment of this implementation is suggested in FIG. 3. In FIG. 3, receiver 300 has connecting line 338 which enables auxiliary equalizer 320 to receive coefficients $w_{main}(i)$ from coefficient updater 312. This function is optional and when used, auxiliary equalizer 320 need not utilize a separate coefficient updater to calculate its own coefficients w(i). Thus, power may be conserved by not running a coefficient updater in auxiliary equalizer 320. According to some embodiments auxiliary equalizer 320 might not have a coefficient updater and thus would rely solely on coefficients $w_{main}(i)$ received from coefficient updater 312. According to other embodiments, auxiliary equalizer 320 might have a coefficient updater and at times equalizer 320 could generate its own coefficients w(i) and at other times equalizer 320 could rely on coefficients $w_{main}(i)$ received from coefficient updater 312. For example, auxiliary equalizer 320 might generate its own coefficients w(i) to improve training operations. Then, during tracking operations, auxiliary equalizer 320 might rely on coefficients $w_{main}(i)$ from coefficient updater 312 so that power may be conserved.

Figure 8:
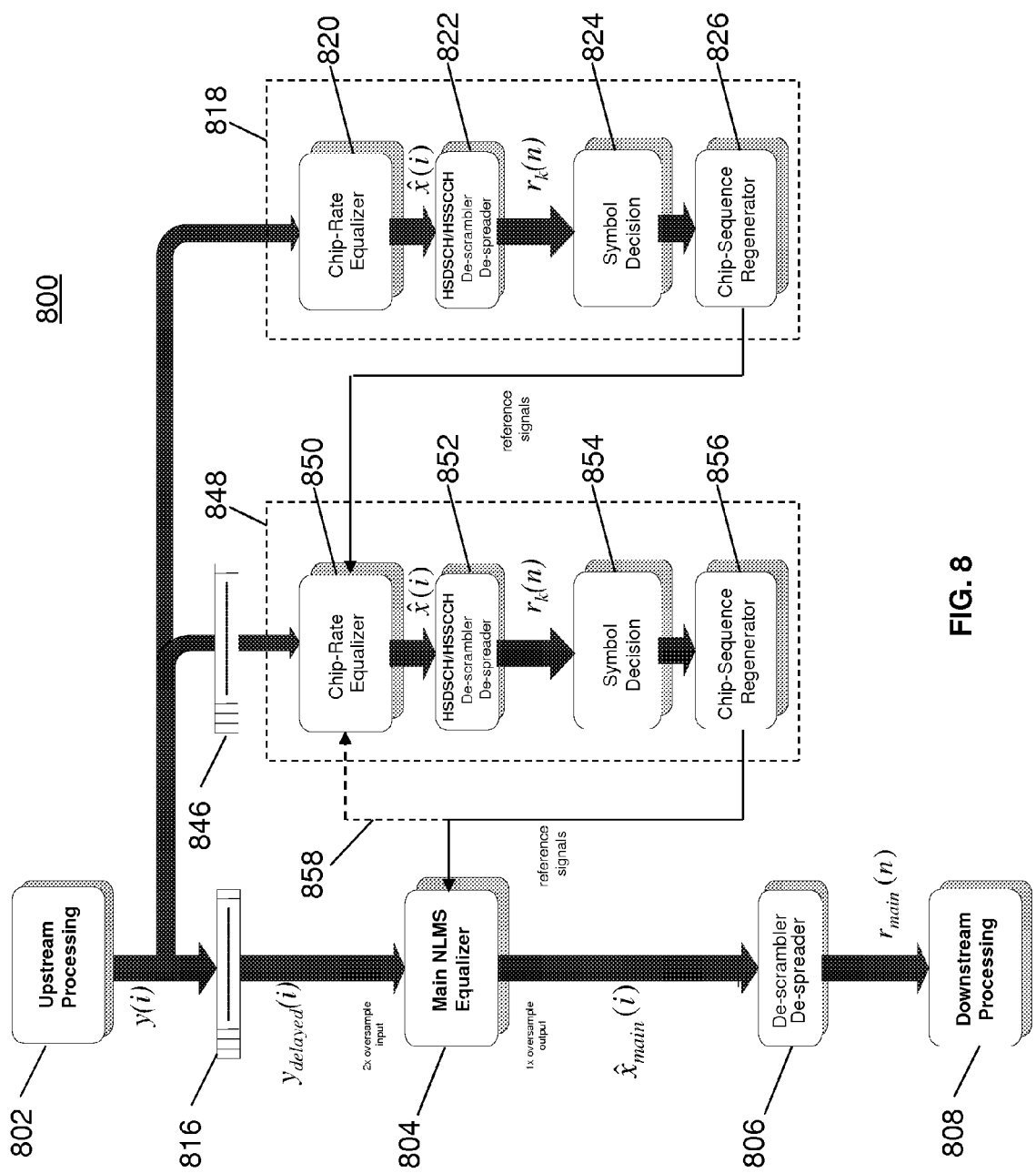
FIG. 8 shows a simplified block diagram of a receiver according to one embodiment of the present invention that has more than one reference generator.

FIG. 8 shows a simplified block diagram of a receiver 800 according to one embodiment of the present invention that has more than one reference generator. Apparatus 800 has upstream processing 802, delay buffer 816, main NLMS equalizer 804, descrambler and despreader 806, and downstream processing 808, which perform operations analogous to those of the equivalent elements of receiver 200 of FIG. 2. Apparatus 800 also has reference generators 818 and 848, which are connected in a pipelined manner. Reference generator 818 performs operations analogous to those of reference generator 218 to generate a first set of one or more reference signals. Reference generator 848 receives a delayed version of received signal y(i) from delay buffer 846 and generates a second set of one or more reference signals using the first set of one or more reference signals and possibly one or more pilot signals. The second set of one or more reference signals may then be used by main equalizer 804 to equalize delayed received signal $y_{delayed}(i)$. Additional embodiments may be envisioned that utilize more than two reference generators, where, except for the first reference generator, each reference generator would be connected to a previous reference generator in a pipelined manner, such that each reference generator equalizes a delayed version of the received signal using the one or more reference signals output from the previous reference generator.

Yet further embodiments of the present invention may be envisioned that iteratively generate sets of one or more reference signals. One such embodiment is suggested in FIG. 8, where reference generator 848 shows dashed connecting line 862, which extends from chip-sequence regenerator 856 to equalizer 850. After generating a set of one or more reference signals, reference generator 848 could use the set of one or more reference signals and possibly one or more pilot channels to generate a subsequent set of one or more reference signals. This iterative process could be repeated any desired number of times before applying the final set of one or more reference signals to main NLMS equalizer 804.

By maintaining the pilot power and generating additional sets of one or more reference signals iteratively or through the use of additional reference generators, the accuracy of the final set of one or more reference signals in approximating the originally transmitted signal may be increased. On the other hand, the pilot power can be decreased with the generation of additional sets of one or more reference signals and the accuracy of the final set of one or more reference signals may be maintained. Other implementations can achieve both reduced pilot power and increased accuracy of the final set of one or more reference signals by partially reducing the power and/or number of pilot channels.

While FIG. 8 shows an embodiment having two reference generators 818 and 848 where reference generator 848 is capable of iteratively generating sets of one or more reference signals, the present invention is not so limited. Various embodiments can be envisioned which use one reference generator or multiple, pipelined reference generators, of which at least one reference generator may support iterative generation of sets of one or more reference signals. The design of such embodiments may take into account the tradeoffs of using pipelined reference generators, iterative generation, or both. In particular, iteratively generating sets of one or more reference signals requires less hardware and consumes less power than pipelined reference generators. On the other hand, the latency of pipelined reference generators may be less than that of iterative processing, since a previous reference generator may be used for processing the next set of received signals, while the subsequent reference generator is processing a particular set of received signals. Various embodiments may balance these tradeoffs by combining the two approaches.

As used in the specification, the term "pilot" refers to any signal having a bit pattern known a priori by the receiver. As such, the term "pilot" includes both traditional pilot channels that have no use other than for training as well as known channels that have other uses such as the synchronization channel (SCH) used in 3rd Generation Partnership Project (3GPP) receivers. Accordingly, reference signal z(i) in FIG. 2 may be based on channels traditionally used for receiver functions other than as pilots (e.g., SCH) in addition to or instead of one or more other pilot channels.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A method for equalizing received signals, the method comprising:
   (a) equalizing a first set of one or more received signals based on at least one pilot channel in the received signals to generate a first set of one or more equalized signals;
   (b) processing the first set of one or more equalized signals to generate a first set of one or more decoded data streams corresponding to a first set of one or more non-pilot channels in the received signals;
   (c) generating one or more reference signals from the first set of one or more decoded data streams; and
   (d) equalizing a second set of one or more received signals based on a combination of (1) the at least one pilot channel and (2) the one or more reference signals to generate a second set of one or more equalized signals, wherein:
      at least one of steps (a)-(d) is implemented in a receiver and
      step (d) comprises filtering the second set of one or more received signals based on a second set of filter coefficients, wherein the second set of filter coefficients is adaptively generated by:
         (1) calculating an error signal by comparing the second set of one or more equalized signals to both (i) the at least one pilot channel and (ii) the one or more reference signals; and
         (2) updating the second set of filter coefficients based on the error signal.

2. The invention of claim 1, further comprising the step of processing the second set of one or more equalized signals to generate a second set of one or more decoded data streams corresponding to a second set of one or more non-pilot channels in the received signals.

3. The invention of claim 1, wherein the second set of one or more received signals is a time-delayed version of the first set of one or more received signals.

4. The invention of claim 1, wherein updating the second set of filter coefficients is further based on a step-size value generated as a function of the number and power of the one or more non-pilot channels used to generate the one or more reference signals.

5. The invention of claim 1, wherein step (a) comprises filtering the first set of one or more received signals using the second set of filter coefficients.

6. The invention of claim 1, wherein step (c) comprises:
   (1) generating a first set of hard decisions for the first set of one or more decoded data streams; and
   (2) recoding the first set of hard decisions for use as the one or more reference signals.

7. The invention of claim 1, wherein:
   steps (a)-(c) are implemented by a reference generator; and
   step (d) is implemented by an equalizer.

8. A method for equalizing received signals, the method comprising:
   (a) equalizing a first set of one or more received signals based on at least one pilot channel in the received signals to generate a first set of one or more equalized signals;
   (b) processing the first set of one or more equalized signals to generate a first set of one or more decoded data streams corresponding to a first set of one or more non-pilot channels in the received signals;
   (c) generating one or more reference signals from the first set of one or more decoded data streams; and
   (d) equalizing a second set of one or more received signals based on a combination of (1) the at least one pilot channel and (2) the one or more reference signals to generate a second set of one or more equalized signals, wherein:
      at least one of steps (a)-(d) is implemented in a receiver; and
      steps (b), (c), and (d) are repeated one or more times for the first set of one or more received signals, wherein, for each repetition, the equalized signals processed in step (b) are the equalized signals generated in the previous implementation of step (d).

9. The invention of claim 8, wherein, for the first set of one or more received signals, two or more sets of one or more reference signals are iteratively generated using a single reference generator.

10. The invention of claim 8, wherein, for the first set of one or more received signals, two or more sets of one or more reference signals are generated using two or more reference generators in a pipelined manner.

11. A method for equalizing received signals, the method comprising:
   (a) equalizing a first set of one or more received signals based on at least one pilot channel in the received signals to generate a first set of one or more equalized signals;
   (b) processing the first set of one or more equalized signals to generate a first set of one or more decoded data streams corresponding to a first set of one or more non-pilot channels in the received signals;
   (c) generating one or more reference signals from the first set of one or more decoded data streams; and
   (d) equalizing a second set of one or more received signals based on a combination of (1) the at least one pilot channel and (2) the one or more reference signals to generate a second set of one or more equalized signals, wherein:
      at least one of steps (a)-(d) is implemented in a receiver; and step (c) comprises:
- (1) determining whether a power value associated with each of the one or more non pilot channels satisfies a power-threshold condition; and
- (2) enabling, for use in generating a reference signal, each decoded data stream corresponding to a non-pilot channel whose associated power value satisfies the power-threshold condition.

12. The invention of claim 11, wherein each power value is a power ratio based on the power of the associated non-pilot channel and the power of the at least one pilot channel.

13. A method for equalizing a received signal in a receiver by filtering the received signal based on a set of filter coefficients to generate an equalized signal, wherein the set of filter coefficients is adaptively generated by:
- (1) calculating an error signal by comparing the equalized signal to one or more reference channels comprising at least a first channel having a bit pattern known a priori by the receiver wherein the first channel is used by the receiver for a purpose other than as a pilot channel; and
- (2) updating the set of filter coefficients based on the error signal.

14. The invention of claim 13, wherein the first channel is a synchronization channel.

* * * * *